(12) United States Patent
Mooney et al.

(10) Patent No.: US 8,789,021 B2
(45) Date of Patent: Jul. 22, 2014

(54) METHOD AND APPARATUS FOR OBJECT-ORIENTED LOAD TESTING OF COMPUTING SYSTEMS

(75) Inventors: Kevin Mooney, Raleigh, NC (US); David A. Scott, Kamuela, HI (US)

(73) Assignee: International Business Machines Corporation, Armonk, NY (US)

(*) Notice: Subject to any disclaimer, the term of this patent is extended or adjusted under 35 U.S.C. 154(b) by 1836 days.

(21) Appl. No.: 11/173,384

(22) Filed: Jun. 30, 2005

(65) Prior Publication Data

US 2007/0006045 A1 Jan. 4, 2007

(51) Int. Cl.
*G06F 9/44* (2006.01)

(52) U.S. Cl.
USPC .......................................... 717/126

(58) Field of Classification Search
None
See application file for complete search history.

(56) References Cited

U.S. PATENT DOCUMENTS

| | | | | |
|---|---|---|---|---|
| 5,261,097 A | * | 11/1993 | Saxon | 718/106 |
| 5,826,081 A | * | 10/1998 | Zolnowsky | 718/103 |
| 5,974,572 A | | 10/1999 | Weinberg et al. | |
| 6,098,090 A | * | 8/2000 | Burns | 718/107 |
| 6,167,537 A | * | 12/2000 | Silva et al. | 714/46 |
| 6,507,946 B2 | | 1/2003 | Alexander, III et al. | |
| 6,526,422 B1 | | 2/2003 | Flood et al. | |
| 6,526,523 B1 | * | 2/2003 | Chen et al. | 714/38 |
| 6,587,879 B1 | * | 7/2003 | Reynolds | 709/224 |
| 6,754,701 B1 | * | 6/2004 | Kessner | 709/219 |
| 6,928,638 B2 | * | 8/2005 | Parvathala et al. | 717/124 |
| 7,313,564 B2 | * | 12/2007 | Melamed et al. | 717/124 |
| 7,451,350 B2 | * | 11/2008 | Cherny et al. | 714/32 |
| 2003/0140138 A1 | * | 7/2003 | Dygon et al. | 709/224 |
| 2005/0198246 A1 | * | 9/2005 | Kegel | 709/223 |
| 2006/0117318 A1 | * | 6/2006 | Rumelhart et al. | 718/104 |

FOREIGN PATENT DOCUMENTS

| | | |
|---|---|---|
| JP | 129400 A | 5/1995 |
| JP | 2003046569 | 2/2003 |

\* cited by examiner

*Primary Examiner* — Li B Zhen
*Assistant Examiner* — Evral Bodden
(74) *Attorney, Agent, or Firm* — Holland & Knight LLP; Brian J. Colandreo, Esq.; Jeffrey T. Packer, Esq.

(57) ABSTRACT

Computer apparatus, method and system for developing, in an existing protocol, load tests of a computing system. The invention includes a kernel that provides a plurality of core actions for use in a subject load test script. Core actions employed in the subject load test script are implemented as respective kernel actions written in an object-oriented programming language underlying the existing protocol. An execution engine applies the subject load test script to a number of test clients. The execution engine schedules for execution and executes the kernel actions in a manner that utilizes a relatively small number of resources as compared to the number of test clients. An extender extends the protocol (e.g., extends the base classes of the protocol and/or adds features to the protocol), and the invention adds corresponding references to the subject load test script accordingly.

17 Claims, 3 Drawing Sheets

METHOD AND APPARATUS FOR OBJECT-ORIENTED LOAD TESTING OF COMPUTING SYSTEMS

BACKGROUND OF THE INVENTION

Tools for generating load against a computing system have been around for decades. All of the tools available today share a common attribute: developing the code to be executed as a load test is always a straight-line, or procedural, activity.

For example, a typical HTTP load test script contains something like:
1. connect to a particular web server
2. get the home page
3. get GIF 1
4. get GIF 2
5. etc.
6. send your login credentials
7. get the next page
8. get GIF 1
9. get GIF 2
10. etc.
11. search for an item to buy
12. get the next page
13. add item to shopping cart
14. get the next page
15. checkout
16. enter credit card data
17. get next page (confirmation)
18. logout
19. get the next page This script is a sequence of events, and developers of load testing tools represent this sequence using either procedural languages (whether proprietary or not) or with procedural code written in an object-oriented language (such as tools on the market that use Java to represent their procedural load test).

These tools suffer to varying degrees from some of the same disadvantages, namely, (1) they use "old" languages with which many modern programmers are unfamiliar, or (2) they use proprietary languages that programmers do not want to learn. In addition, even tools that use modern object-oriented languages like Java or C++ are plagued with a different set of problems, namely, that they require excessive resources to produce a load test (some tools require one OS process per user, others require one thread per user). The combination of these two sets of problem areas has produced a set of tools that are never both modern and performant.

Further, procedural load testing tools suffer from a common malady. When there is a need to add support for another type of back-end system (e.g., an HTTP server or a database server, or a particular application server like BEA, Web-Sphere, etc.), many client libraries need to be developed in order to allow the solution to function as needed. This is an arduous process that can only be done by the manufacturer or by a partner working with the manufacturer of the load testing tool.

SUMMARY OF THE INVENTION

The present invention addresses the problems of the prior art. The present invention provides a protocol extensibility mechanism that extends the basic classes available in an object-oriented load testing system. This extensibility can be used to extend, or add features, to an existing protocol (e.g., HTTP) or to develop an entirely new protocol without the help of the manufacturer beyond the extensibility documentation provided with the product.

In a preferred embodiment, a computer apparatus, method and system enables development of load tests of a computing system. The invention system includes a kernel that provides a plurality of core actions for use in a subject load test script. Core actions employed in the subject load test script are implemented as respective atomic kernel actions written in an object-oriented programming language (e.g., JAVA) underlying an existing protocol. An execution engine applies the subject load test script to a number of test clients. The execution engine schedules for execution and executes the kernel actions in a manner that utilizes a relatively small number of resources as compared to the number of test clients. An extender extends the protocol (e.g., extends the base classes of the protocol and/or adds features to the protocol), and the invention system responsively adds corresponding references to the subject load test script accordingly (due to the kernel being written in the underlying object oriented programming language or the like with inheritance features).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to a system/tools for generating code to be executed as load(s) for a computing system. Developers of load testing (test scripts) have represented a sequence of steps using either procedural languages or procedural code written in object-oriented languages, e.g., Java. In the present invention, a kernel is written in Java and is portable to many platforms, and provides the core actions that are used by any load test script. Further, a protocol extensibility mechanism of the present invention extends the basic classes available in an object-oriented load test system. Because of the object-oriented architecture, particular actions in action-based load testing products are allowed and enabled to be extensible. The extensibility mechanism may be used to implement HTTP, SSL and Oracle products on a load testing product as will be understood by the following further description.

Figure 3:
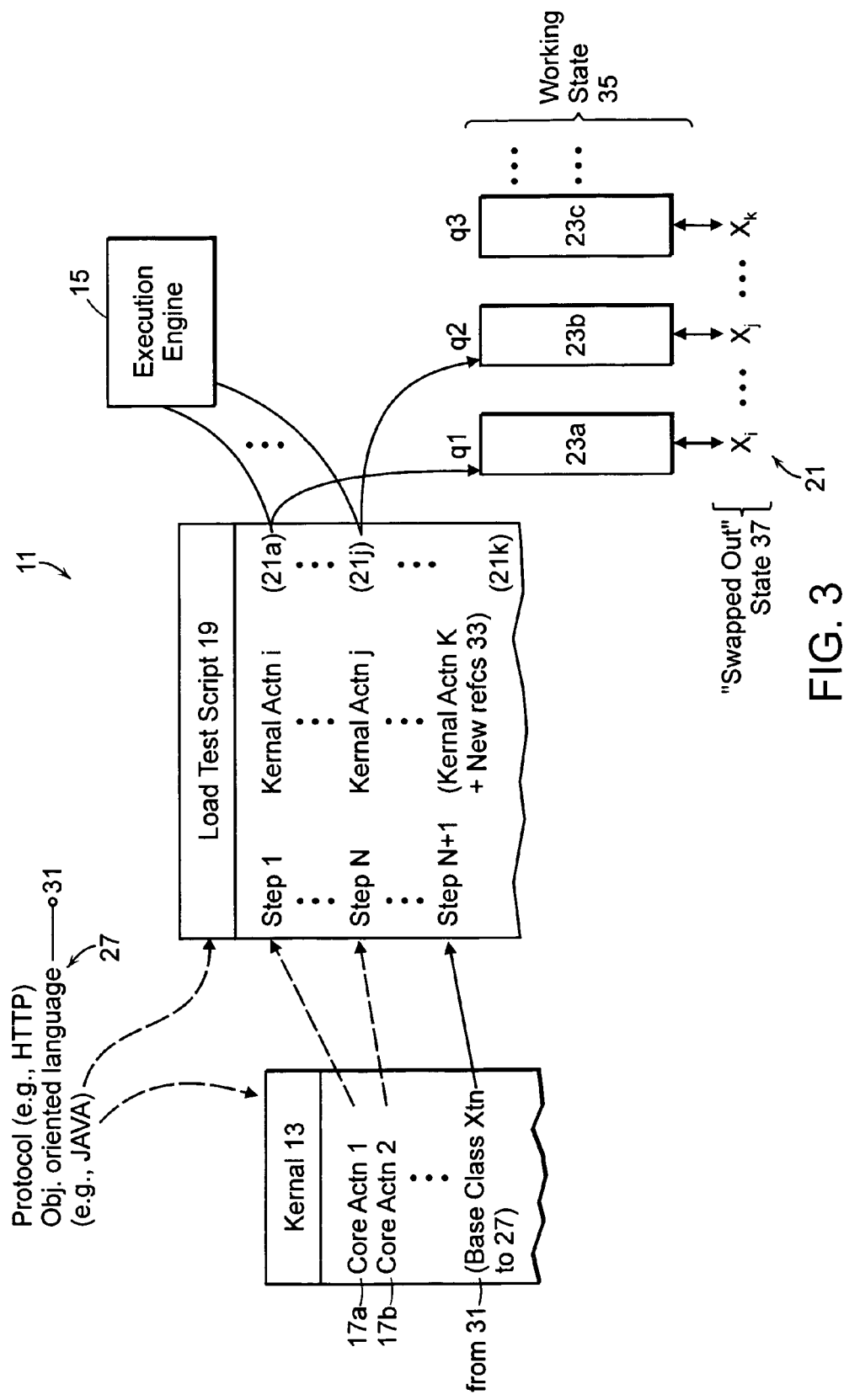
FIG. 3 is a schematic view of a preferred embodiment of the present invention.

As illustrated in FIG. 3, given a subject protocol (e.g., HTTP), there is a standard object-oriented language (e.g., Java, SmallTalk, etc.) underlying the protocol. The present invention load testing system 11 utilizes (takes advantage of) this underlying object-oriented programming language.

The preferred embodiment of the present invention employs the Java programming language as the execution programming language of choice for developing load tests. Other programming languages are suitable for writing load test scripts in accordance with principles of the present invention. If a test developer has a choice between learning Java or learning a proprietary language, Java has the advantages that it is well known (so the developer can get help from others if needed) and that the skills are very portable to other endeavors. Further, the developer of a load test has the full power (loops, structures, classes, etc.) of the Java programming language at their disposal.

In the load testing system 11 of the present invention, there is a kernel 13 and an execution engine 15. The "kernel" 13 is preferably written in Java (the underlying object-oriented language 27 of the subject protocol), is portable to many platforms, and provides the core "actions" 17 that are used by any load test script 19.

The execution engine 15 handles the scheduling and execution of all actions 17 using a very small number of resources (threads, memory) to execute very large numbers of virtual test clients.

"Kernel" 13 Execution Architecture

In order to achieve very high scalability with extremely small overhead, the kernel 13 execution architecture is based largely on operating systems and queuing theory. The execution architecture treats all individual activities that need to be accomplished as "kernel actions" 21. These actions 21 are atomic in nature and are swapped into and out of executable states when each action 21 needs to be serviced. All actions 21 performed by a script 19 are simply specializations of the corresponding core action 17 that can be executed at will. This provides for an extremely flexible and powerful facility for developing tests.

In the prior art example above, most of the steps are likely related to an input/output system. The prior art kernel provides the base classes on top of which is built a networking class. This class can be called to send and receive traffic over the network and thus provide functionality similar to that of the original scenario that was followed. The primary difference between other Java-based solutions and the present invention is that other solutions execute in a simple, procedural fashion and require a single thread per user emulated to generate the load; whereas the present invention kernel 13, because it treats all these activities 21 equally, can swap these actions 21 into and out of the execution space with a very small number of threads for a very large number of emulated users.

In order to make sure that the execution engine 15 is free to do its job of scheduling actions 21, many basic constructs of the Java language 27 (e.g., WHILE and FOR statements) have been implemented as kernel actions 21 that can be used by any load tests developer/script writer.

Execution Engine 15

In order to execute a large number of users with a very small number of threads, the execution engine 15 employs a parallel series of queues 23 and states 35, 37 that allow the "worker" threads (the ones that execute the actions 21 and generate the load) to service any action 21 at any time. The actions 21 migrate from one state 35, 37 to another after they have been serviced by a worker thread. This powerful architecture allows the vast majority of actions 21 (likely to be actions performing either network I/O or waiting between commands) to be "swapped out" of queues 23 while they are waiting for network I/Os to complete or for timeouts to occur. When the completion takes place or the timeout occurs, the action 21 is placed back into an execution queue 23 to be serviced by another worker thread.

Because the architecture of the load test scripts 19 (present invention load testing products) is object-oriented and action 17 based, the kernel actions 21 are extensible. For example, many load testing scripts 19 need to employ a networking protocol to communicate with a backend server. But, if a particular system needs every network request to be routed through a specialized proxy server or an encryption mechanism, then the present invention accommodates this by extending the IO base class 31 and adding new references 33 to the scripts 19 to be run. These resultant new kernel actions 21$k$ are executed in place of the old with no modifications needed to the rest of the kernel 13 of the load test product.

This extensibility mechanism is used to implement HTTP, SSL, and Oracle protocols in various embodiments of the present invention.

In addition, the present invention provides functional decomposition. This may best be described by discussing how load testing is traditionally done and how Applicants with the present invention have changed from that.

When a software architect is developing a load testing tool where the system will need to provide the equivalent of many "users" doing largely the same thing, there have been two basic approaches:

1) create a series of instructions (steps) for each "user" to execute and create an operating system process for each of those users and let that process execute the steps, 2) have a central engine that creates operating system "threads" and gives the series of steps to one of these threads to execute.

In essence, the problem has been broken down (or, functionally decomposed) to the level of a user. If a tester wants three users to do the same series of steps (1 . . . n), then the tester creates identical copies of the steps (1 . . . n) and gives each copy to an execution medium (either a process or a thread). The execution medium will then execute the series of steps (1 . . . n).

In the present invention, Applicants have decomposed the problem much further. Applicants have functionally decomposed to the level of an individual action that one of those users executes (for example, an I/O operation, a loop, a container (which one could think of as the items between two curly braces)) and have modeled it as an object in an object oriented language. The present invention 11 then creates specific "protocols" (or instructions) for how to complete such an action. For example, if testing an HTTP protocol, I/O operations almost always include a certain set of header information (cookies, modification times of the page, etc). An HTTP I/O action would add its information about what to send to the server on top of the data actually being sent over the wire by the kernel.

One, most significant, advantage to decomposing the problem in this way is that the present invention load testing system 11 does not need to create a process (or, indeed, even a thread) for each of the users. The present invention system 11 places all of the "actions" (again, 1 . . . n) for each of our-three users (totaling n*3 steps) into a single queue 23. Drawing from this queue 23 are a small number of threads (perhaps, two) that don't know how to do anything except execute these small, atomic pieces of work (the action; e.g., the I/O operation). In this example, the process may require the use of two threads to support three "users" worth of actions.

Because there is much time during which nothing is happening for a particular user (waiting for an I/O to complete, or waiting for a certain amount of time to elapse before continuing), and the present invention system 11 does not need to occupy the thread during this time, because of the decomposition to a lower level, one finds that invention system 11 can easily support 4000*n actions (or, 4000 copies of the "steps"; or, said another way, "emulate 4000 users") with a mere 30 threads. The prior existing tools would require 4000 processes or 4000 threads to support this.

The number of processes an operating system can create, or, indeed, the number of threads it can manage, are severely limiting factors in determining the scalability of a load testing tool (how many users it will emulate). The present invention has taken these two limitations out of the picture and has, thus, greatly increased the potential scalability of the load testing system.

Figure 1:
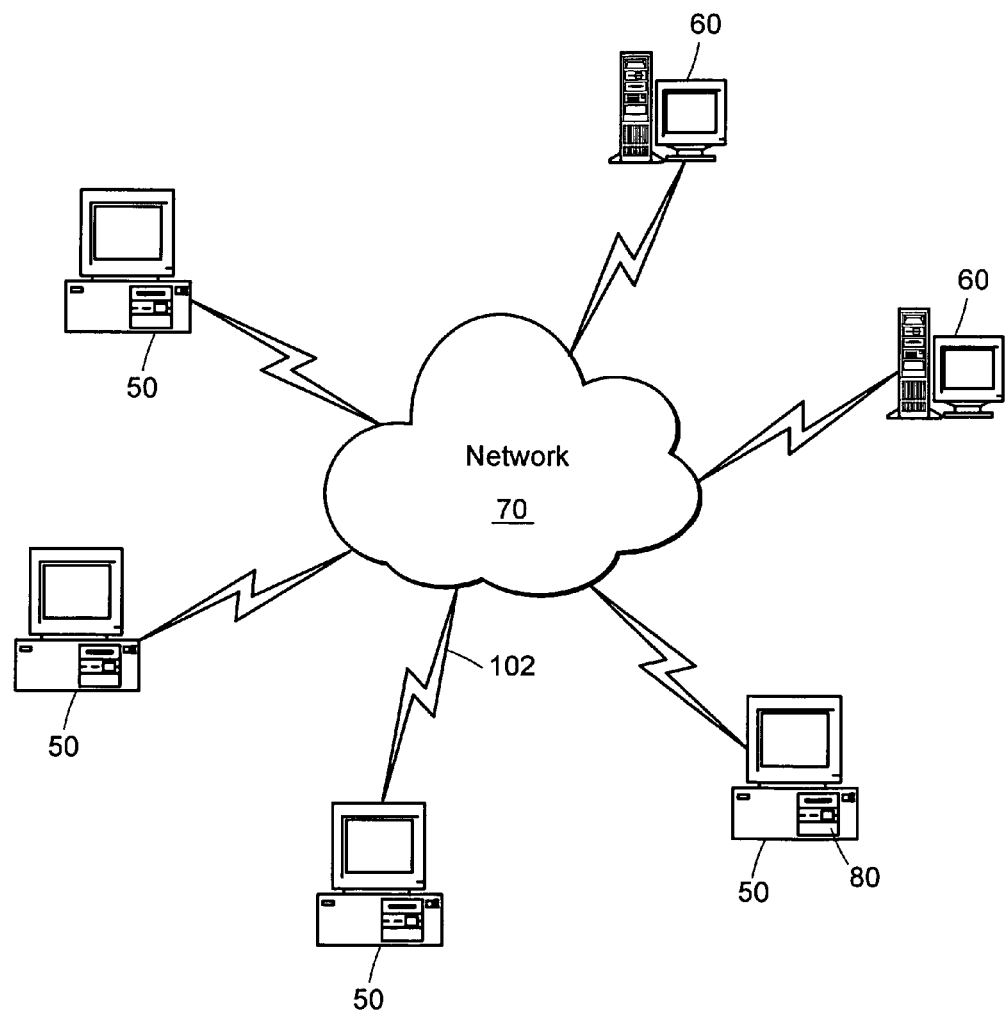
FIG. 1 is a schematic view of a computer network in which embodiments of the present invention are operated.

The present invention also includes computer implementation of the above-described object oriented load testing. FIG. 1 illustrates one embodiment of such a computer implementation. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a stand-alone computer.

Figure 2:
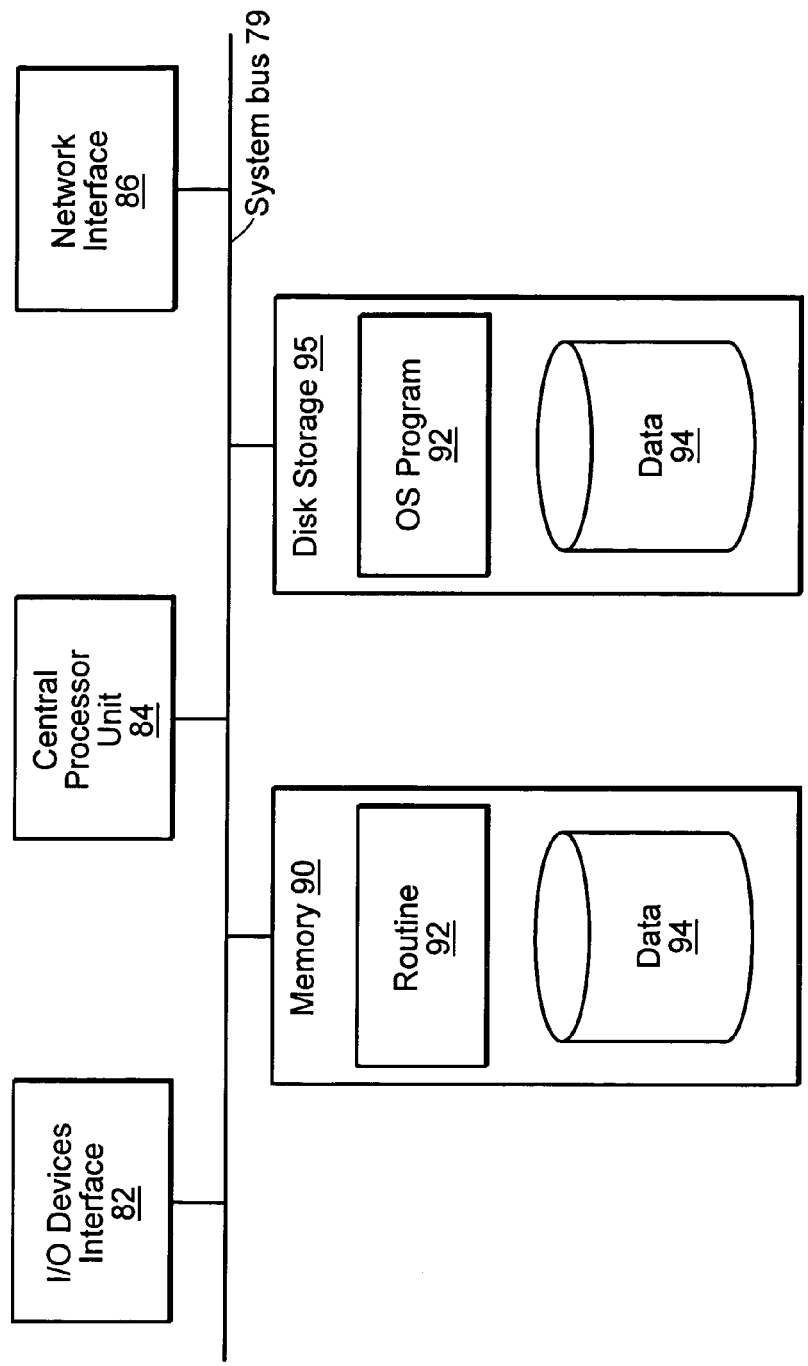
FIG. 2 is a block diagram of a computer in the network of FIG. 1.

FIG. 2 is a diagram of the internal structure of a computer (e.g., client computer(s) 50 or server computers 60) in the computer system of FIG. 1. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 1). Memory 90 provides volatile storage for computer software instructions used to implement an embodiment of the present invention (e.g., Program Routines 92 and Data 94, such as Kernel 13, Execution Engine 15 and Load Test Script 19). Disk storage 95 provides non-volatile storage for computer software instructions and data used to implement an embodiment of the present invention. Central processor unit 84 is also attached to system bus 79 and provides for the execution of computer instructions.

In one embodiment, computer program product 80, including a computer readable medium (e.g., a removable storage medium such as one or more DVD-ROM's, CD-ROM's, diskettes, tapes, or other carrier medium, etc.) provides at least a portion of the software instructions for kernel 13, execution engine 15 and/or any component of invention load testing system 11. Computer program product 80 can be installed by any suitable software installation procedure, as is well known in the art. In another embodiment, at least a portion of the software instructions may also be downloaded over a wireless connection. Computer program propagated signal product 102 embodied on a propagated signal on a propagation medium (e.g., a radio wave, an infrared wave, a laser wave, a sound wave, or an electrical wave propagated over a global network such as the Internet, or other network(s)) provides at least a portion of the software instructions for kernel 13, execution engine 15 and/or any component of invention load testing system 11.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 50, 60 may receive and read, such as by receiving the propagation medium and identifying a propagated signal embodied in the propagation medium, as described above for computer program propagated signal product 102.

It is understood that, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

The disclosure is intended to describe a framework for making the development of new protocols easier and more efficient.

Also, this disclosure presumes that there is a standard, object-oriented language 17 (Java, C++, Smalltalk, etc.) underlying the protocol. This makes it possible for one to create a protocol on top of a basic "kernel" mechanism 13.

What is claimed is:

1. Computer apparatus for developing load tests of a computing system, the apparatus having an existing protocol and comprising:

a kernel in memory providing a plurality of core actions for use in a subject load test script, core actions employed in the subject load test script being implemented as respective atomic kernel actions that are specializations of the corresponding core actions that can be executed at will, the kernel being written in an object-oriented programming language underlying the existing protocol of the apparatus such that each individual kernel action is modeled as a respective object in the object-oriented programming language enabling different kernel actions to be treated equally in execution resources, and each kernel action being atomic and extensible;

an execution engine in working memory executed by a processor and applying the subject load test script to a number of test clients, the execution engine as executed by the processor scheduling for execution and executing the kernel actions, the kernel actions being able to be swapped into and out of executable states and individually executed at will and treated equally enabling a number of resources per number of kernel actions instead of per number of test clients, and resulting in use of a relatively small number of resources as compared to the number of test clients, wherein the relatively small number of resources is less than one thread per user emulated to generate a load, wherein the processor is free from creating a process for each test client and wherein the processor enables a plurality of kernel actions of different test clients in one process; and an extender in memory operatively communicating with the kernel and extending the protocol including any combination of extending base classes of the protocol and adding features to the protocol, the kernel enabling the subject load test script to be responsive to extensions of the protocol and adding corresponding references to the test script to be run resulting in, for a given kernel action, a new kernel action being executed in place of the given kernel action free of necessitating modification of the rest of the kernel.

2. Computer apparatus as claimed in claim 1 wherein the execution engine swaps kernel actions into and out of execution space with a very small number of threads for a very large number of emulated users.

3. Computer apparatus as claimed in claim 1 wherein the execution engine employs a plurality of queues that allow execution threads to execute any kernel action at any time.

4. Computer apparatus as claimed in claim 3 wherein the queues are coupled in parallel.

5. Computer apparatus as claimed in claim 1 wherein the object oriented programming language is JAVA.

6. A method for developing, in an existing protocol, load tests of computing systems, the method comprising the computer implemented steps of:

providing in memory a kernel having a plurality of core actions for use in a subject load test script;

for core actions employed in the subject load test script, implementing the core actions as kernel actions that are specializations of the corresponding core actions that can be executed at will, and that are written in an object oriented programming language underlying the existing protocol such that each individual kernel action is modeled as a respective object in the object-oriented programming language enabling different kernel actions to be treated equally in execution resources, each kernel action being atomic and extensible; and applying the subject load test script to a number of test clients including scheduling for execution and executing the kernel actions using a processor, the kernel actions being able to be swapped into and out of executable states and individually executed at will and treated equally enabling a number of resources per number of kernel actions instead of per number of test clients, resulting in use of a relatively small number of resources as compared to the number of test clients, wherein the relatively small number of resources is less than one thread per user emulated to generate a load, wherein the processor is free from creating a process for each test client and wherein the processor enables a plurality of kernel actions of different test clients in one process;

wherein the step of implementing the core actions as kernel actions includes:

extending base classes of the protocol; and adding corresponding references to the subject load test script, resulting in, for a given kernel action, a new kernel action being executed in place of the given kernel action free of necessitating modification of rest of the kernel.

7. A method as claimed in claim 6 further comprising the step of swapping kernel actions into and out of execution with a very small number of threads for a very large number of emulated users.

8. A method as claimed in claim 6 wherein the step of executing further includes employing a plurality of queues to enable execution of any kernel action at any time.

9. A method as claimed in claim 6 wherein the step of extending further includes adding features to the protocol.

10. A method as claimed in claim 6 wherein the object oriented programming language is JAVA.

11. A computer program product comprising a non-transitory computer usable storage medium including computer usable program code stored thereon for developing, in an existing protocol, load tests of computing systems, said computer program product being non-transitory and including:

computer usable program code for providing a kernel having a plurality of core actions for use in a subject load test script;

for core actions employed in the subject load test script, computer usable program code for implementing the core actions as kernel actions that are specializations of the corresponding core actions that can be executed at will, and that are written in an object oriented programming language underlying the existing protocol such that each individual kernel action is modeled as a respective object in the object-oriented programming language enabling different kernel actions to be treated equally in execution resources and each kernel action being atomic and extensible;

computer usable program code for applying the subject load test script to a number of test clients, including scheduling for execution and executing the kernel actions using a processor, the kernel actions being able to be swapped into and out of executable states and individually executed at will and treated equally enabling a number of resources per number of kernel actions instead of per number of test clients, and resulting in use of a relatively small number of resources as compared to the number of test clients, wherein the relatively small number of resources is less than one thread per user emulated to generate a load, wherein the processor is free from creating a process for each test client and wherein the processor enables a plurality of kernel actions of different test clients in one process;

computer useable program code for extending base classes and/or adding features of the protocol; and computer useable program code for automating addition of corresponding references to the subject load test script, resulting in, for a given kernel action, a new kernel action executed in place of the given kernel action free of needing to modify rest of the kernel.

12. A computer program product as claimed in claim 11 further comprising computer usable program code for swapping kernel actions into and out of execution with a very small number of threads for a very large number of emulated users.

13. A computer program product as claimed in claim 11 wherein the object oriented programming language is JAVA.

14. A computer system for developing, in an existing protocol, load tests of computing systems, comprising:

kernel means in memory providing a plurality of kernel actions for use in a subject load test script, the kernel actions being executable at will specializations of core actions stored in memory, the kernel actions being written in an object-oriented programming language underlying the existing protocol such that each individual kernel action is modeled as a respective object in the object-oriented programming language enabling different kernel actions to be treated equally in execution resources including threads and processes, and each kernel action being atomic and extensible;

execution means executable by a processor for applying the subject load test script to a number of test clients, the execution means scheduling for execution and executing the kernel actions, the kernel actions being able to be swapped into and out of executable states and individually executed at will and treated equally enabling a number of resources per number of kernel actions instead of per number of test clients, and resulting in use of a relatively small number of resources as compared to the number of test clients, the relatively small number being on the order of less than one thread per user emulated to generate a load, wherein the processor is free from creating a process for each test client and wherein the processor enables a plurality of kernel actions of different test clients in one process; and extension means in memory operatively communicating with the kernel means for extending the protocol including any combination of extending base classes of the protocol and adding features to the protocol, wherein the kernel means enables corresponding references to extensions of the protocol to be automatically added to the subject load test script, resulting in, for a given kernel action, a new kernel action being executed in place of the given kernel action free of modifying rest of the kernel means.

15. A computer system as claimed in claim 14 wherein the execution means swaps kernel actions into and out of execution with a very small number of threads for a very large number of emulated users.

16. A computer system as claimed in claim 14 wherein the execution means employs a plurality of queues that allow execution threads to execute any kernel action at any time.

17. A computer system as claimed in claim 14 wherein the object oriented programming language is JAVA.

\* \* \* \* \*